July 24, 1956

H. A. LANG 2,756,279

COUNTER FOR TAPE RECORDER

Filed May 23, 1952

INVENTOR.
HARRY A. LANG,
BY: Harold B. Hood.
ATTORNEY.

2,756,279

COUNTER FOR TAPE RECORDER

Harry A. Lang, Evansville, Ind.

Application May 23, 1952, Serial No. 289,696
5 Claims. (Cl. 179—100.2)

The present invention relates to sound recorders and more particularly to the magnetic type sound recorder employing a reel of metallic wire or tape material on which sound impulses may be magnetically impressed.

With the advent of the so-called "tape recorder" and its rising popularity in the home, one major shortcoming of an otherwise ideal piece of equipment, has been the fact that while cherished memories can be permanently preserved in sound on the reels of tape, no means has heretofore been devised whereby a user can precisely locate and play back a particular portion of a given reel. In the past, when one wished to hear a particular selection or incident, recorded at some unknown spot throughout the length of tape, it has been necessary to play either the entire reel or to attempt to locate the portion by "hit and miss" methods, both of which are, of course, highly unsatisfactory. The primary object of the invention is, therefore, to provide means whereby the user can precisely locate a particular portion of tape without the vexing necessity of playing the entire reel.

More specifically, I propose to provide a simple attachment universally adaptable to any given type tape or wire recorder whereby there is provided a visual record of the progress of the tape in its passage from the storage reel to the wind-up reel. By noting the number of revolutions of one of said reels, at either end of a particular portion of the tape, the user may compile a permanent record for reference when again wishing to replay any particular portion of the reel.

Further, by such means, the user may edit his reels of tape, removing undesirable portions of the recording and re-recording on those portions of the tape. This has heretofore been impossible since no simple means for precisely locating an undesirable portion has been available. An attempt to remove parts of the recorded material, more often than not, resulted in the removal of more or less of the material than was desired. Therefore a further object of the invention is to provide a means whereby a user may effectively edit a reel of recorded material.

A still further object is to provide a method whereby the user of a "tape recorder" may record certain material and thereafter edit the recorded material being assured that in the process of editing, he will remove from the tape only the undesirable portions leaving the desirable portions intact.

Ancillary objects of the invention will become apparent as the description proceeds.

To the accomplishment of the above and related objects, my invention may be embodied in the form illustrated in the accompanying drawings, attention being called to the fact, however, that drawings are illustrative only and that change may be made in the specific construction illustrated and described, so long as the scope of the appended claims is not violated.

Figures 1, 2, 3:
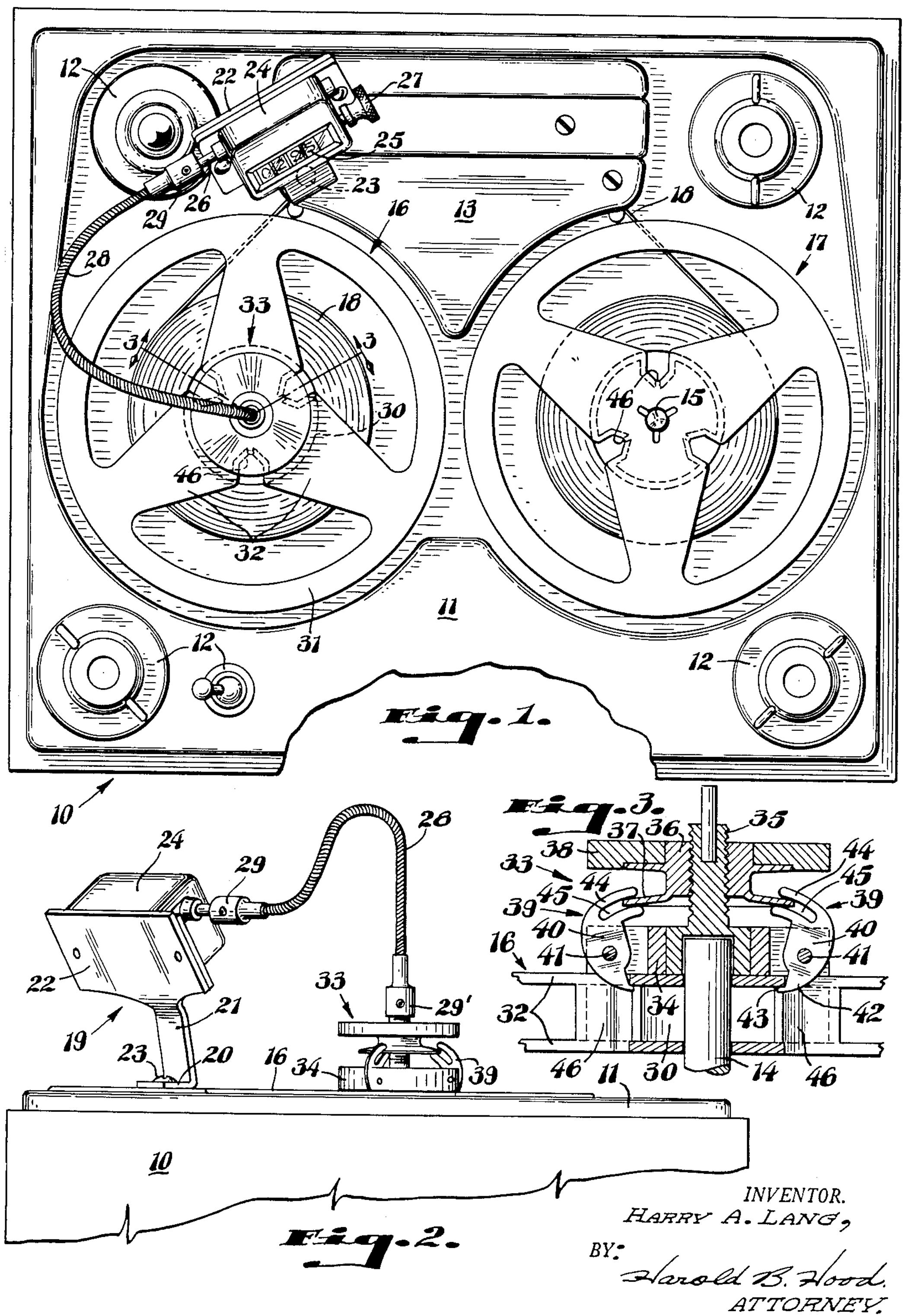
Fig. 1 is a plan view of a more or less conventional type tape recorder showing my invention associated therewith.
Fig. 2 is a side elevation of the device of Fig. 1 as viewed from the lefthand side of Fig. 1.
Fig. 3 is a sectional view taken substantially on the line 3—3 of Fig. 1 and showing a detail of my invention.

Referring more particularly to the drawings, it will be seen that I have illustrated a more or less conventional type tape recorder 10 having a chassis 11 on which are positioned the necessary controls 12, the recording head 13 and a pair of spaced, substantially parallel spindles 14 and 15 on which are supported a pair of reels 16 and 17. The reels are driven through the medium of the spindles 14 and 15 by suitable mechanism within the recorder 10, the details of such mechanism being wholly immaterial to my present invention. The tape 18, which may be a metallic impregnated material upon which sound impulses can be magnetically impressed, is led from around one of the reels, through the recording head 13 and around the other reel.

My invention involves the provision of an attachment, for use with any standard make "home recorder," whereby a visual record may be had at any time showing the progress of the tape as it passes from one of the reels to the other. To that end, I provide a bracket 19 suitably supported on chassis 11 adjacent one of the reels. Quite obviously, the design of this bracket will necessarily vary with the different makes of recorders. In the embodiment illustrated, the bracket comprises a foot 20, an upright portion 21, and a platform 22. To mount the bracket to the chassis, a screw 23, in the vicinity of one of the reels, is removed from the chassis and passed through a perforation in the foot 20.

Upon the platform 22, I mount a conventional revolution counter 24 having a visual dial portion 25, a drive shaft 26 and a reset knob 27. To the drive shaft 26 a flexible cable 28 is secured by means of a suitable fitting and set screw combination 29. Preferably, the counter 24 will be reversible and resettable, though these features are not indispensable.

All tape commercially available for use in recorders here under consideration, is supplied on the same form of reel which comprises a central hub 30 having a suitable spindle opening therein to be sleeved on either of the spindles of the recorder; axially spaced rim portions; a plurality of spokes 32 radiating from hub 30 and supporting rim portions in spaced relationship; and a series of radially-inwardly-extending sockets 46 at the roots of the spokes. Tape 18 is wound around the hub 30 between the spokes and rim portions.

To provide a driving connection, between one of the reels and the counter shaft 26, I provide a clutch arrangement 33 comprising a disc 34 from which centrally projects a threaded stud 35. The distal end of cable 28 is fixed to stud 35 by means of a fitting 29' similar to fitting 29.

Threadedly received on stud 35 is a hub 36 supporting a radially projecting ring member 37 substantially parallel with disc 34 and coaxial with stud 35. Preferably, a second disc 38 is supported from hub 36 substantially parallel with disc 34, for a purpose later to become apparent.

Spaced about the periphery of disc 34 are a number of gripper elements 39 equal in number to the number of sockets 46 in reel 16. Each such element comprises a body portion 40 pivoted for oscillation about an axis 41 substantially perpendicular to a radius of disc 34. A gripper portion 42 projects beyond the surface of disc 34 remote from ring 37, and preferably carries a toe 43 protruding toward the axis of stud 35.

Remote from gripper portion 42 is a bifurcated portion 44 extending into the region between discs 34 and 38. The cleft 45 between the furcations of such portion opens toward the axis of stud 35 and the periphery of ring 37 is interengaged in cleft 45 between the said furcations.

From an inspection of Fig. 3 it will be seen that axial movement of ring 37 away from disc 34 will rock gripper elements 39 about their respective axes, moving the gripper portions 42 and toes 43 toward the axis of stud 35. The chuck is so proportioned and designed that when disc 34 is placed against hub 30, one of the gripper elements 39 will be disposed in each of the sockets 46. The gripper portion 42 will overlie the periphery of the hub and the toes 43, as ring 37 retreats from disc 34, will move to underlie the edge of the hub 30, in the apex of the associated socket, thus firmly attaching the chuck to reel 16 against axial displacement as well as relative rotation. The second disc 38 provides a convenient manipulating knob for effecting the turning of ring 37. As said before, cable 28 is securely fastened to the free end of stud 35.

As recording begins, the tape is led from around the reel 17, through the recording head 13 and around reel 16. By the re-set knob 27, the dial portion 25 of counter 24 is set to read "0" and as the tape is unwound from reel 17 and wound on reel 16, the revolutions of reel 16 are indicated by counter 24. Thus as a particular portion of the tape is being recorded upon, the revolution reading at the beginning and end of that portion can be noted and a record made thereof. Thereafter, it is only necessary to run the tape from reel 17 to reel 16 without "playing" the tape, and commence "playing" only when the revolution counter registers the number of revolutions corresponding with the noted number.

My invention also finds great utility in editing a reel of tape. By "playing" the reel and noting the revolution numbers of the reel at the beginning and end of the parts to be removed, those parts, and those alone, may then be accurately removed by running the tape through the removing head to "erase" exactly the portions of the tape between the noted numbers. Those portions may then be re-recorded with desirable material.

While admittedly, my invention is simple, it is this very simplicity which so recommends it, both from a commercial and from a utilitarian standpoint. Nothing in the prior art known to me suggests my concept or lends itself to the accomplishment of my ultimate objects.

I claim as my invention:

1. In combination with a sound recorder of the type having a pair of reels for the winding and storage thereon of a strand of material on which sound impulses may be impressed, said reels being mounted for rotation upon spaced, parallel axes and each comprising a hub, axially spaced rims and a plurality of spokes carried by said hub and supporting said rims, means whereby an operator may segregate a particular portion of the recorded sound throughout the length of material on a particular reel of material comprising a bracket stationarily supported from the chassis of said recorder adjacent one of said reels, a revolution counter mounted on said bracket and having a dial for visually indicating the revolutions of said one reel, a chuck, and cable means connecting said chuck with said drive shaft of said counter, said chuck being removably connected with the hub of said one reel to be driven thereby, said chuck in turn driving said counter through the medium of said cable means, in which said chuck comprises a disc, a threaded stud upstanding from said disc near the center thereof, said cable being fixed to said stud, an annular ring coaxial with said stud and threadedly received thereon, and a plurality of gripper elements carried by said disc, each such gripper element being oscillable about an axis substantially perpendicular to a radius of said disc and each supporting a gripper portion projecting beyond the surface of said disc remote from said ring and a bifurcated portion projecting beyond the surface of said disc adjacent said ring, the periphery of said ring being interengaged between the furcations of said last-named portion such that movement of said ring axially toward and away from said first disc will cause the gripper elements to rock about their axes to move the gripper portions respectively away from and toward the axis of said stud to grip said reel hub.

2. In combination with a sound recorder of the type having a pair of reels for the winding and storage thereon of a strand of material on which sound impulses may be impressed, said reels being mounted for rotation upon spaced, parallel axes and each comprising a hub, axially spaced rims and a plurality of spokes carried by said hub and supporting said rims, means whereby an operator may segregate a particular portion of the recorded sound throughout the length of material on a particular reel of material comprising a bracket stationarily supported from the chassis of said recorder adjacent one of said reels, a revolution counter mounted on said bracket and having a dial for visually indicating the revolutions of said one reel, a chuck, and cable means connecting said chuck with said drive shaft of said counter, said chuck being removably connected with the hub of said one reel to be driven thereby, said chuck in turn driving said counter through the medium of said cable means, in which said chuck comprises a first disc, a threaded stud upstanding from said disc near the center thereof, said cable being fixed to said stud, a second disc threadedly received on said stud for movement toward and away from said first disc, an annular ring supported from said second disc between said first and second discs concentric with said stud, and a plurality of radially disposed gripper elements carried by said first disc, each gripper element being oscillable about an axis substantially perpendicular to a radius of said first disc and each comprising a gripper portion projecting beyond the surface of said first disc on the side thereof remote from said second disc and having a toe projecting therefrom toward said stud axis, and a bifurcated portion projecting into the region between said first and second discs, the periphery of said ring being interengaged between the furcations of said last-named portion such that movement of said ring toward and away from said first disc will cause said gripper elements to rock about their axes to move said toes respectively away from and toward the axis of said stud to grip said reel hub.

3. For use with a magnetic-strand recorder, an attachment comprising a revolution counter having an indicator dial, a drive shaft, and a reset knob, means for supporting said counter on the chassis of such a recorder, chuck means, and cable means drivingly connecting said chuck means to the drive shaft of said counter, said chuck means comprising a disc, a stud centrally upstanding therefrom, said cable means being fixed to said stud, and a plurality of peripherally spaced gripper elements projecting from the side of said disc remote from said stud, said gripper elements being cooperable with a reel of such a recorder to releasably hold said disc thereto.

4. The device of claim 3 in which said stud is threaded, a second disc threadedly received on said stud for movement toward and away from said first disc, an annular ring supported from said second disc between said first and second discs concentric with said stud, each gripper element being oscillable about an axis substantially perpendicular to a radius of said first disc and each comprising a gripper portion projecting beyond the surface of said first disc on the side thereof remote from said second disc and having a toe projecting therefrom toward said stud axis, and a bifurcated portion projecting into the region between said first and second discs, the periphery of said ring being interengaged between the furcations of said last-named portion such that movement of said ring toward and away from said first disc will cause said gripper elements to rock about their axes to move said toes respectively away from and toward the axis of said stud to grip the hub of said reel.

5. An attachment for sound recorders of the type having a pair of reels for the winding and storage thereon of a strand of material on which sound impulses may be impressed, one of said reels comprising a hub, axially-spaced rims and a plurality of spokes carried by said hub and supporting said rims, said attachment comprising a bracket adapted to be stationarily supported from the chassis of a recorder adjacent one of such reels, a revolution counter mounted on said bracket, a chuck comprising a disc, a threaded stud upstanding from said disc near the center thereof, a cable connecting said stud to drive said counter, an annular ring coaxial with said stud and threadedly received thereon, and a plurality of gripper elements carried by said disc, each gripper element being oscillable about an axis substantially perpendicular to a radius of said disc and each comprising a gripper portion projecting beyond the surface of said disc remote from said ring and a bifurcated portion projecting beyond the surface of said disc adjacent said ring, the periphery of said ring being interengaged between the furcations of said last-named portions so that movement of said ring axially toward and away from said disc will cause the gripper elements to rock about their axes to move said gripper portions respectively away from and toward the axis of said stud.

References Cited in the file of this patent

UNITED STATES PATENTS

| | | |
|---|---|---|
| 2,480,742 | Kent | Aug. 30, 1949 |
| 2,540,406 | Ranger | Feb. 6, 1951 |
| 2,563,545 | Moreland | Aug. 7, 1951 |

OTHER REFERENCES

"Elements of Magnetic Tape Recording," Shaney, June 15, 1950, pages 95–97.